Nov. 5, 1946.    W. R. WEEMS    2,410,473
ELECTRIC DIRECTIONAL GYROSCOPE
Filed May 13, 1943    3 Sheets-Sheet 1

INVENTOR
WILLIAM R. WEEMS
BY
ATTORNEYS

Nov. 5, 1946.  W. R. WEEMS  2,410,473
ELECTRIC DIRECTIONAL GYROSCOPE
Filed May 13, 1943

INVENTOR
WILLIAM R. WEEMS

Patented Nov. 5, 1946

2,410,473

UNITED STATES PATENT OFFICE 2,410,473

ELECTRIC DIRECTIONAL GYROSCOPE

William R. Weems, Decatur, Ga.

Application May 13, 1943, Serial No. 486,807

6 Claims. (Cl. 74—5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gyroscope devices, and more particularly, to an erecting system for directional gyroscopes, and includes an improved precessing mechanism for reducing to a minimum the effective friction at the gimbal bearings for the gyroscope, tending to cause precession thereof, and thus obviating the necessity for the employment of precision anti-friction bearings for the gyroscope mounting means or gimbals.

An object of the invention is the provision of positive gyroscope precessing means for a balanced or free gyroscope device carried by a mobile support, such as an airplane, vehicle or other craft, in which the precessing means effects a continuous slight oscillatory motion to the gyroscope gimbal means to precess the gyroscope axis back and forth between a relatively small tilting angle and maintains the axis of the gyroscope in a substantially predetermined reference position with respect to the mobile support.

A further object is the provision of gimbal oscillating means for a gimbaled free gyroscope to alternately precess the spin axis of the rotor thereof back and forth across a predetermined substantially fixed reference plane with relation to the supporting craft whereby the oscillations of the gimbal means in opposite directions cancel out the effective frictional resistance between the support and the bearings of the gimbals, tending to precess the gyroscope, thus making it possible to employ inexpensive bearings, such as the solid bushing types, which have a higher coefficient of friction than ordinarily employed in precision gyroscope devices, and which are more resistant to impact loads, less liable to be damaged in shipment, or in use, and which may be more easily, economically and quickly manufactured in quantity.

Another object is the employment of a positive oscillatory precessing system for a free gyroscope device which not only cancels out the effective frictional resistance between the gimbal bearings, tending to cause undesirable precession, but also permits the use of electrical or mechanical pickoff devices, for effectively controlling oscillation and precession of the gyroscope, having a relatively high contact pressure without the introduction of undue or uncontrollable directional shifting errors in the gyroscope.

Another object is the provision of oscillatory erecting means for the inner gimbal of the gyroscope, reducing to a minimum the possiblity of upsetting or tumbling the gyroscope during relative angular shifting movements of the mobile support for the gyroscope device.

A still further object is the provision of positive oscillatory erecting means for a gyroscope whereby the spin axis of the gyroscope is oscillated within close limits back and forth across a substantially fixed reference plane with respect to the mobile support, including separate controllable torque-applying means for precessing the spin axis laterally of said reference plane and supplemental automatic follow-up control means on the support for subsequently shifting the support with relation to the spin axis to again establish the said substantially fixed relation between the spin axis and the support.

Another object is the provision of a reversible torque-applying device for the outer gimbal of a gimbaled free gyroscope which is automatically controllable by precession of the inner gimbal with relation to a fixed reference for alternately applying torque in opposite directions to the outer gimbal in direct ratio to the relative degree of precession of the inner gimbal to maintain said spin axis of the gyroscope in a substantially fixed relation to the outer gimbal.

A further object is the provision of a second connectable torque-applying device for selectively and directionally applying torque to the inner gimbal to precess the outer gimbal in one direction or the other, and servomotor operated follow-up means operable to cause application of a steering torque on the steering control of the mobile support to shift the support to a predetermined reference relation with the adjusted spin axis of the gyroscope.

Like reference characters refer to like parts on the several figures of the drawings, in which Fig. 1 is a side elevation of my improved gyroscope device, certain parts being broken away and shown in section, and certain of the wiring arrangement being disclosed more or less diagrammatically.

Figure 1:
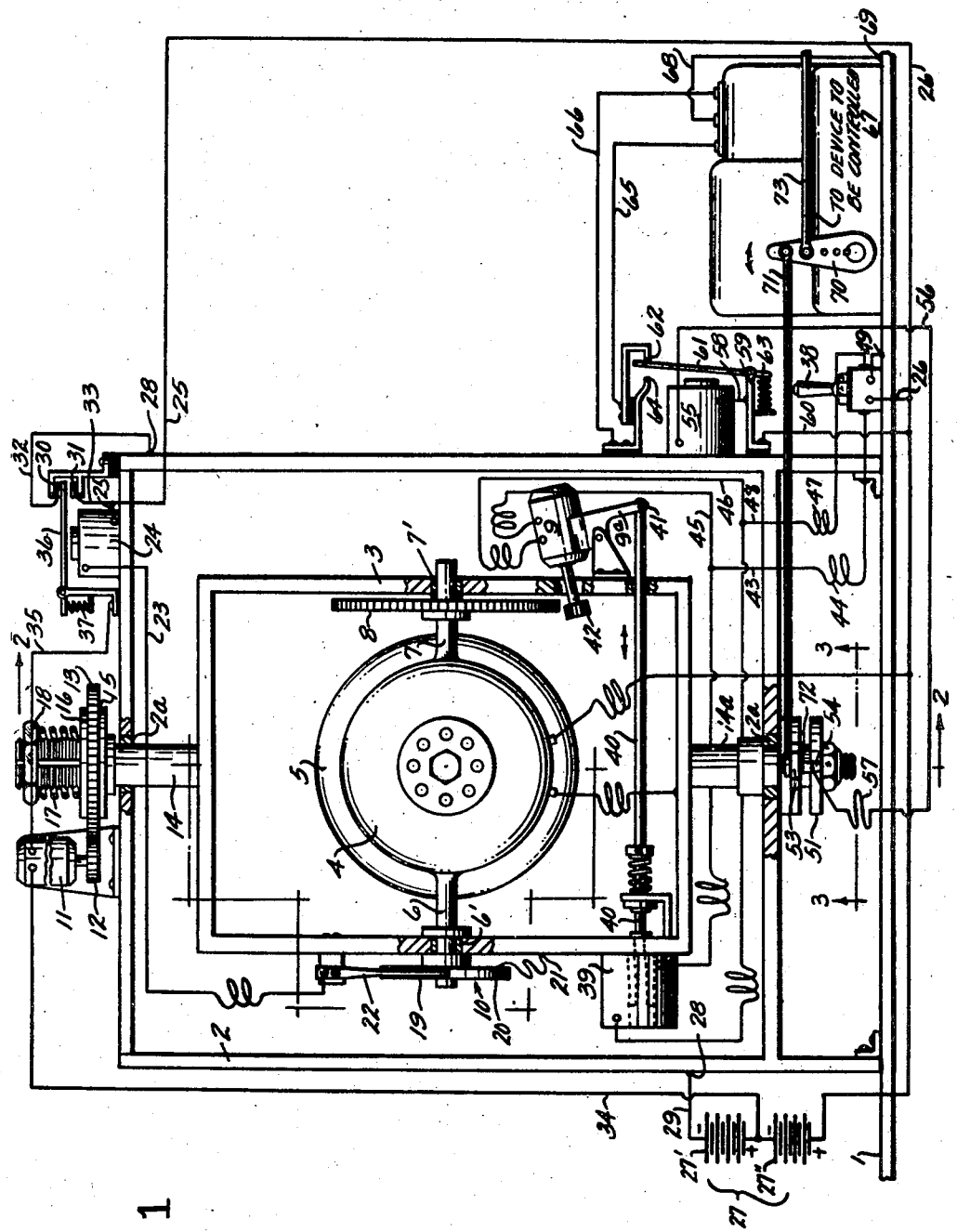

Referring particularly to Fig. 1, the numeral 1 indicates a support such as a part of an aircraft or other mobile craft having my improved gyroscope device mounted thereon, and 2, a gyroscope frame or casing carrying an outer gimbal member 3, journaled for rotation about an axis fixed with relation to said casing. The outer gimbal member 3 has journaled thereon an inner gimbal member 4 carrying a gyroscope wheel or rotor 5 with its spin axis fixed therein.

The two gimbal members 3 and 4 have their turning axes substantially perpendicular to each other to permit the rotor spin axis to tilt in mutually perpendicular intersecting planes in the customary manner. The inner gimbal member 4 comprises a casing or frame carrying an electric motor or other suitable device for driving the rotor, said inner gimbal member being provided with shaft or trunnion members 6 and 7, suitably journaled in bearings 6' and 7' fixed in the outer gimbal member 3. The shaft member 7 has fixed thereto a torque-applying gear 8 arranged to be engaged by a tiltable outer gimbal precessing motor 9. The other supporting shaft 6 for the inner gimbal member carries a pickoff control member 10 fixed thereto for controlling the oscillatory precessional movements of the inner gimbal member through a reversible torque-applying means or motor 11 carried on the supporting frame 2 of the gyroscope device.

This motor 11 carries a small gear 12 meshing with a large gear 13 mounted on the upper trunnion or shaft 14 of the outer gimbal member 3. The gear 13 is disposed between a fixed flange 15 on the trunnion shaft 14 and a washer 16 splined to the shaft 14, and a spring 17 surrounds the shaft and is tensioned against the washer 16 by an adjusting nut 18 to maintain a frictional driving relation between the gear 13 and shaft 14. The friction may be increased or decreased by adjusting the nut 18 threaded on the extension of the shaft.

Figure 2:
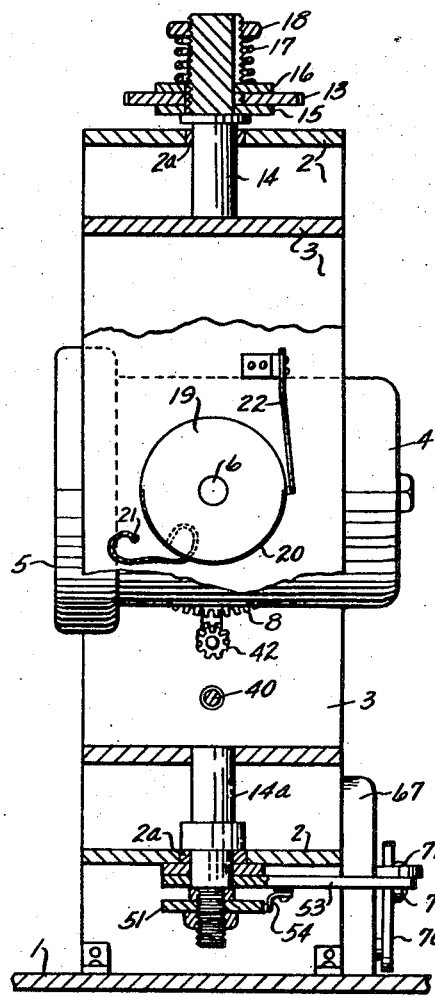
Fig. 2 is a vertical sectional view taken approximately on the line 2—2 of Fig. 1.
Figure 3:
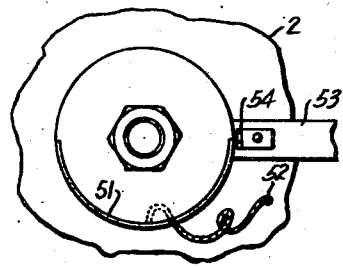
Fig. 3 is a bottom view disclosing primarily the follow-up control means for the servomotor and airplane control elements.

Referring now to Fig. 2, the inner gimbal member precessing pickoff means 10 for controlling the operation of the reversible torque-applying motor 11 comprises a disc 19, preferably of insulating material, fixed to the shaft 6, having a substantially semicircular contact ring 20 on its periphery, which is grounded to the frame, as indicated at 21, and cooperating with a contact blade 22, carried by the outer gimbal frame 3 in insulated relation thereto. A circuit wire 23 connects said blade with a single pole, double throw relay switch 24 mounted on the gyroscope frame 2. An electrical conductor 25 leads from the relay to a feed wire 26 connected to one side of a battery or other electrical power source 27. The other side of this battery is grounded at 28 to the gyroscope frame 1 through the conductor 29. The contact terminals of the relay are indicated at 30 and 31, and a conductor 32 connects the terminal 30 to the conductor 29 at a point between the battery 27 and ground connection 28. The other relay contact terminal 31 is connected by a conductor 33 to a conductor 25 leading to the conductor 26 leading to the battery 27. This battery, as illustrated in the drawings, comprises two connected power units 27' and 27", and a conductor 34 connects one terminal of the reversible torque motor 11 for the outer gimbal to the battery intermediate the two units 27' and 27", while the other terminal of this torque motor is connected by the conductor 35 to the armature 36 of the relay 21. The armature 36 is normally held in engagement with the relay contact 30 by a spring 37 when the relay is not energized, but when contact is made between the contact ring 20 of the pickoff 10 and the contact blade 22 on the outer gimbal member, the relay 24 is energized, causing the armature 36 to move into circuit-closing engagement with the relay contact terminal 31.

In the normal or de-energized position of the relay, current will flow from the positive side of the battery unit 27' through the conductor 34, motor 11, conductor 35, armature 36, contact terminal 30, and wire 32, back to the other side of the battery unit 27'. This causes the armature of the motor 11 to tend to rotate in one direction exerting a torque through the gear 13 on the outer gimbal 3, causing precession of the inner gimbal member towards the predetermined reference plane fixed with relation to the axis of the outer gimbal member 3. As the inner gimbal member precesses or tilts, the pickoff disc 10 moved thereby closes the circuit to the relay 24, and current now flows from battery unit 27" through conductors 26 and 25, through the relay-energizing coil, conductor 23, contact blade 22 and pigtail connection to ground connection 21 on the outer gimbal frame 3, and through the frame ground connection 28 and conductor 29 to the other side of the battery 27". Energizing the relay, as disclosed, now causes a reversal of the direction of current to the torque motor 11, current flowing from the positive side of the battery unit 27" through conductors 26, 25 and 33, to the lower relay contact 31 now in contact with the armature 36, and through the armature 36, conductor 35, torque motor 11, conductor 34, to the negative side of the battery unit 27".

The precessing system for the inner gimbal just described produces a continuous oscillation, which gives on and off electrical signals to the relay 24 in relation to the relative displacement in one direction or the other between the inner and outer gimbal members, and in relation to the duration of said relative displacement. When the "on" signal is transmitted to the relay 24, this causes a reverse current flow to the torque motor 11, exerting a torque on the outer gimbal to erect the inner gimbal to its proper reference position with respect to the outer gimbal, while the "off" or "no signal" relation allows the relay to energize the torque motor 11, due to reverse current flow, and causes application of torque in the opposite direction. As the outer gimbal bearings exert a frictional torque on the outer gimbal member, this will tend to tumble or tilt the inner gimbal member, but as soon as the inner gimbal member has moved appreciably in one direction, the pickoff device 10 will operate the relay, causing the torque motor 11 to exert an opposite torque on the outer gimal to precess the inner gimbal to its proper reference position, thereby practically nullifying the effect of friction on the outer gimbal. If the tilt is in the other direction, the relay functions to restore the inner gimbal.

Thus, it will be seen that these signals are converted into immediate torque applications through the torque motor 11 by the relay 24, and due to the absence of any dead spot, the inner gimbal is caused to continuously oscillate back and forth through a given reference plane with respect to the outer gimbal at all times, and the effect of any unbalanced torque on the outer gimbal is therefore merely to cause the signal or torque application under the control of the pickoff 10 to last longer on one oscillation than the other, thus giving a relatively mean oscillatory torque to the outer gimbal member, which is sufficient to counteract any unbalanced torque or friction at the inner, and also the outer gimbal bearings. Thus the elimination of any delay between the application of an unbalanced torque and the automatic application of the proper corrective torque eliminates the effective friction of the inner gimbal bearings, as well as the frictional torque on the outer gimbal bearings and the relative drag of the pickoff devices, since the outer gimbal member tends to drift in azimuth, mainly due to torque exerted on the inner gimbal member and inner gimbal pickoff devices. This construction, therefore, permits the use of inexpensive bearings, such as sleeve or bushing types, which may be manufactured economically and in quantity; also, a considerably heavier contact pressure on the pickoff devices can be employed without impairing the accuracy of the gyroscope. These advantages make it possible to manufacture these gyroscope devices in quantity by mass production methods at a material saving in labor, material and expense.

In order to selectively precess the outer gimbal 3 with respect to the support 1 or gyroscope casing 2, I provide a control switch member 38, shiftable to energize a magnet 39, which, when energized, draws the armature rod 40 to the left. This rod is connected at 41 to an arm 9a fixed to the casing of the motor 9 and rocks this torque motor to engage its small gear 42 with the large inner gimbal torque gear 8. Simultaneously with the meshing of these gears, the torque motor 9 is energized to apply torque in one direction or the other, depending upon the direction of movement of the control member of the switch 38, thus supplying a selectable torque in one direction or the other to the inner gimbal member 4, causing precession of the outer gimbal in one direction or the other.

Referring to the wiring diagram, the control switch 38 is preferably of the double throw type, so that movement thereof in one direction or the other causes a reverse current to flow to the torque motor 9. When the control lever for the switch 38 is moved in one direction, current will flow from the battery 27 through conductors 26 and 43, pigtail 44 and conductor 45, to one terminal of the outer gimbal precessing motor 9, and also to one terminal of the magnet 39. Current then flows from the magnet 39 and torque motor 9 through the conductor 46, pigtail 47 and conductor 48, back through the control switch 38 to the grounded connection indicated at 49. The other side of the battery 27' is grounded at 28 through the conductor 29, as previously set forth. Movement of the control member for the switch 38 closes the circuit to the torque motor 9 and magnet 39, but the direction of movement of the control member for the switch determines the direction of current flow, and consequently, the direction of application of torque to the inner gimbal member 4.

Figure 4:
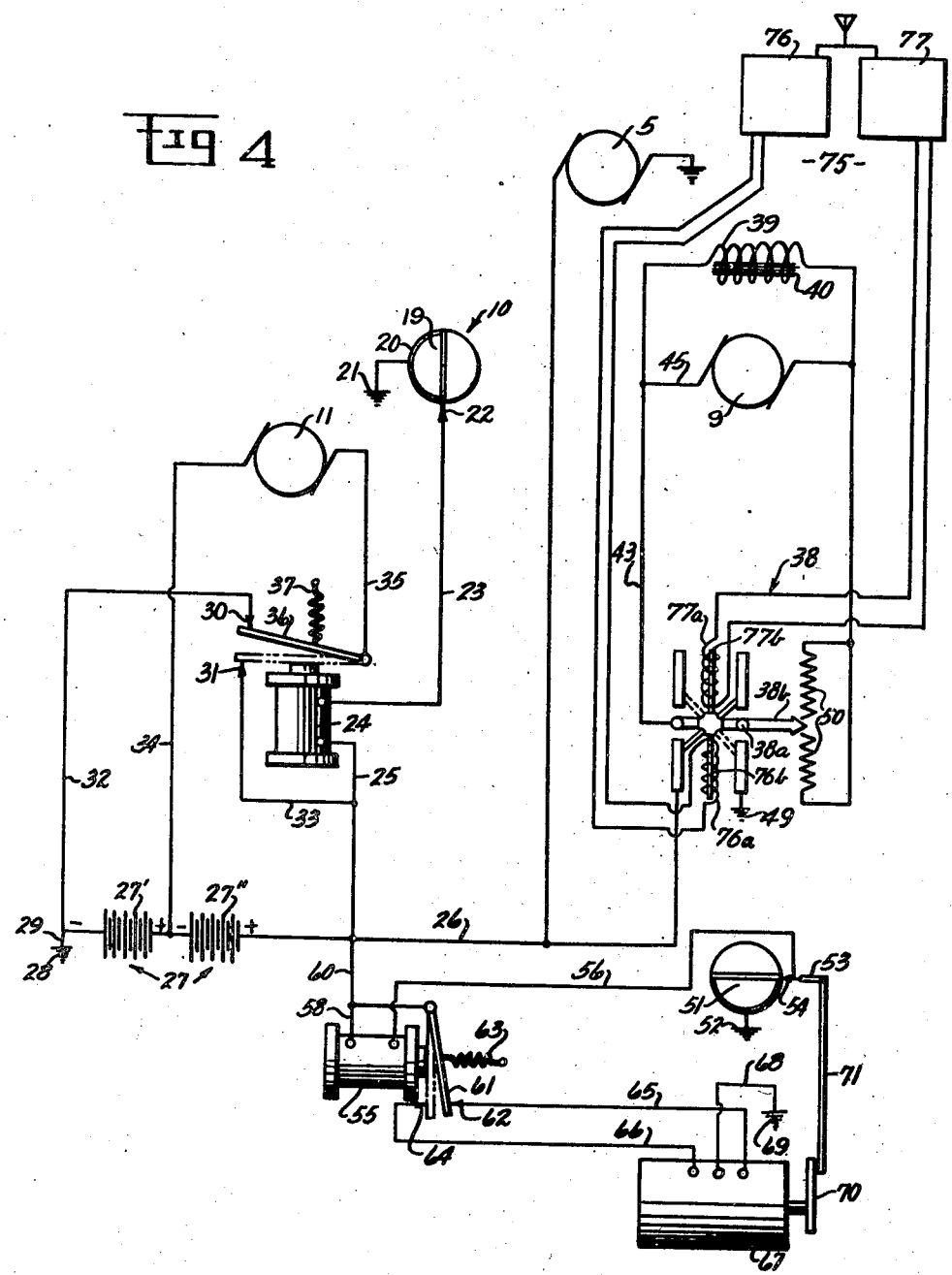
Fig. 4 is a wiring diagram.

I preferably provide a resistance element, as indicated diagrammatically at 50 in Fig. 4, which is positioned in the controlling circuit for the torque motor 9 and connected for simultaneous operation with the switch control member for the switch 38 so that the amount of torque applied to the inner gimbal may be variably controlled, as well as the direction of the torque. This controls the direction and rate of precession of the outer gimbal.

A follow-up means is preferably employed for the outer gimbal operable in a fixed ratio with respect to the rotative displacement or precession of the outer gimbal on its axis. This follow-up means comprises a pickoff contact disc 51 fixed on the lower shaft or trunnion member 14a of the outer gimbal 3 to move therewith. This follow-up disc is constructed similarly to the pickoff disc 10, and carries a similar semicircular contact strip 52 grounded on the gyroscope frame. The lower trunnion or shaft 14a, as well as the upper trunnion 14 of the outer gimbal, are journaled in suitable bearings 2a, the shaft 14a carrying a follow-up arm 53 in insulated relation thereto, having a spring contact finger 54 adapted to engage the insulated pickoff disc 51 or the contact strip 52. This contact finger 54 is connected to a single pole, double throw relay 55 through a conductor 56 and pigtail 57. The other side of the relay is connected by the conductor 58 to the positive side of the battery 27 through the insulated bracket 59, conduit 60 and conductor 26. The return circuit from the negative side of the battery is through the conduit 29 to the gyroscope supporting frame 2 at 28, and through the frame to the grounded contact ring 52 of the pickoff 51 on the lower gimbal shaft 14a. The relay 55, similar to the relay 24, is secured to the frame 2 and the armature 61 of this relay 55, like the armature of the relay 24, is normally held in engagement with a relay contact 62 by a spring 63 when the relay is not energized. Upon relative displacement between the follow-up arm 53 and pickoff 51, so as to establish contact between the contact finger 54 and the ring 52 of the pickoff disc, the relay magnet moves the armature 61 into contact with a second relay contact terminal 64. These contact terminals 62 and 64 are connected respectively by conductors 65 and 66 to a reversible servomotor or power means 67. This motor 67 has one of its circuit connections grounded by the conductor 68 on the frame at 69. Current flows from the battery 27 through the conductors 26 and 60, as before indicated, to the armature blade 61, and depending upon whether the relay is energized or not, current will flow through one or the other of the conductors 65 or 66 to the servomotor, and will return to the other side of the battery through the ground connection 69. Depending upon whether the relay 55 is energized or not, and the armature of the relay is in engagement with the contact 64 or 62, rotation in one direction or the other of the servomotor 67 will be effected, which rotates the actuating arm 70 of the motor in one direction or the other This actuating arm 70 has connected thereto a follow-up link or connecting rod 71, the other end of this link being connected at 72 to the follow-up arm 53. The arrangement of this follow-up construction also provides a continuously oscillating control system for actuating the follow-up arm 53 with relation to a fixed reference position with respect to the position of the outer gimbal member. On or off signals from the pickoff device 51 cause the armature of the relay 55 to oscillate and to reversely energize the servomotor 67, oscillating the actuating arm 70 of the servomotor, and through the link 71, the follow-up arm 53 is oscillated back and forth across a fixed reference with relation to the end of the contact ring 52 on the outer gimbal pickoff disc 51.

In order to establish a steering or directional control with a steering or directing means of a mobile support such as an airplane or other craft carrying the gyroscope device, I provide an actuating member 73, which member may be, for example, connected to the rudder, ailerons or elevators of the airplane or other craft. When the gyroscope device is mounted with its rotor spin axis in proper controlling relation, deviation of the craft will cause the outer gimbal to turn on its axis, actuating the follow-up means 51, and in consequence, motor 67, causing the actuating member 73 to apply the proper corrective control to the steering or directing means to turn or maneuver the craft back to its original or adjusted reference position with relation to the position of the outer gimbal member 3 of the gyroscope device.

If desired, the manual control switch 38 may be connected for actuation by any suitable conventional radiant energy operated control mechanism 75 so as to cause the control member 38 to be selectively shifted by radiant energy received from a remotely located radiant energy sending station comprises two receivers 76 and 77 tuned to predetermined different radio frequencies. The output of the two receivers energizes one or the other of the magnet coils 76a or 77a, which in turn shifts the switch contacts 38a and 38b. Initial movement of the contacts 38a, due to incoming signals, energizes one or the other of the coils 76a or 77a, which in turn attracts the armature 76b or 77b. The intensity of the current controls the amount of movement of the solenoid armatures, and the effective contact position of the contacts 38b, with respect to the resistance 50, controls the amount of electric energy received by the torque motor 9. In the utilization of my improved system employing a continuous controllable oscillatory precession of the inner gimbal member, I find that the apparatus may be utilized to effectively control an aircraft by radio or other radiant energy means, the system maintaining the spin axis of the gyroscope rotor in continuous oscillation within narrow limits relative to a predetermined reference plane while the airplane turns so that while the spin axis may be angled in any direction with respect to the airplane, any tendency toward tumbling of the gyroscope is effectively controlled or prevented by the oscillatory precession of the inner gimbal under the control of the inner gimbal pickoff and relay device. The gyroscope device may therefore be used in steep turns, banks, pitch and roll, and other maneuvers of an aircraft without the usual necessity of caging or positive erection thereof.

The construction of my gyroscope device, therefore, affords considerable advantages over the conventional gyroscope device, especially when used in craft controlled by radiant energy, or where it is desirable to perform quick maneuvers of the craft.

My improved gyroscope device is also adaptable for a two-axis control, since the spin axis of the rotor may be oriented in the fore and aft direction of the aircraft and the erection system may be varied so as to erect the inner gimbal with respect to a pendulous reference instead of the outer gimbal, thus allowing the gyroscope to be used to control the aircraft in pitch as well as in azimuth.

The gyroscope device is also adaptable to "slave use" since the outer gimbal may be made north-seeking or target-seeking by replacing the azimuth precession switch by a control device which is operated by a signal from a magnetic compass or other target-seeking device.

The drawings disclose one embodiment of my invention, it being obvious that many changes could be made in the above construction, and many widely different embodiments of this invention could be utilized without departing from the scope thereof. It is intended that the description and illustration herein shall be interpreted as illustrative, and not in a limiting sense.

Having thus described my invention, what I claim and desire to secure by Letters Patent is:

1. In a gyroscope device, a fixed support, inner and outer gimbal members carried thereby for rotative movement about mutually perpendicular axes, a power-driven rotor universally mounted on said support in said inner gimbal member with its spin axis tiltable in mutually intersecting planes, reversible torque-applying means between the support and the outer gimbal member for applying oscillatory torque to the outer gimbal member to precess the inner gimbal and rotor spin axis back and forth across a reference plane fixed with respect to the outer gimbal member, said reversible torque-applying means between the support and the outer gimbal member including pickoff control means therefor between said inner and outer gimbals operatively connecting said torque-applying means for operation thereof incident to oscillatory movement of said inner gimbal member across said fixed reference plane, and controllable torque applying means between the inner and outer gimbal members to apply rotative torque to said inner gimbal member in the plane of the oscillatory precession to selectively precess the outer gimbal member and spin axis of the rotor with respect to the support in a plane at an angle to the plane of oscillatory precession of the rotor spin axis and the inner gimbal member.

2. In a directional gyroscope for controlling the direction of flight of an aircraft, gyroscope means having a support adapted to be carried by said aircraft for detecting change in direction of the aircraft including a rotor gimbaled on the support for three degrees of freedom, means for precessing said rotor spin axes in mutually intersecting planes, one of said precessing means comprising continuously operable oscillatory torque-applying means between the support and the gimbal operative upon departure of the spin axis from the fixed reference plane in either direction to apply a corrective torque to the gimbal substantially parallel to the last reference plane to precess the rotor spin axis to said reference plane, another of said precessing means comprising means for selectively applying torque to said rotor spin axis substantially at right angles to the said reference plane to selectively precess the rotor spin axis angularly in said reference plane, servomotor means and follow-up means between said gyroscope gimbal and support and selectively operable by relative displacement therebetween incident to relative angular displacement of said rotor spin axis in said reference plane to shift the followup means in direct ratio to the gimbal displacement, and means simultaneously operable by said servomotor means adapted to be connected with a flight-direction-adjusting means for the aircraft to cause actuation thereof in ratio to movement of the followup means to change the direction of flight of the aircraft to shift the position of the support to restore the relative position of the spin axis of the rotor to its former relation with respect to the support and the aircraft.

3. In a gyroscope device, a fixed support, inner and outer gimbal members carried thereby for pivotal movement in mutually intersecting planes, a rotor mounted to spin in said inner gimbal member with its axis in fixed relation thereto, means for driving said rotor, oscillatory precession control means for said inner gimbal member comprising an energizing circuit and electrical pickoff control means between said inner and outer gimbal members having relatively movable contact members controlling said circuit and operable to close said circuit upon relative rotative movement of the inner gimbal member on its axis in one direction past a reference plane fixed with respect to the pivotal axis of the outer gimbal member and to open said circuit upon rotative movement of said inner gimbal member on its axis in the opposite direction past said reference plane, a relay device connected in said circuit and adapted to be energized when said circuit is closed, reversible electromagnetic torque means arranged between said support and the outer gimbal member to apply a rotative torque in one direction or the other to the outer gimbal member to reversely precess the inner gimbal member relative to the outer gimbal member, and an energizing circuit connected between said relay device and said torque-applying means including circuit-closing means for energizing said torque-applying means to apply torque to the outer gimbal member in one direction when the relay is energized and to reversely energize said torque-applying means to cause application of a reverse torque to the outer gimbal member when said relay device is de-energized.

4. In a gyroscope device, a fixed support, inner and outer gimbal members carried thereby for pivotal movement in mutually intersecting planes, a rotor mounted to rotate with its spin axis fixed in relation to said inner gimbal member, means for driving said rotor, reversible precession control means for said inner gimbal member including a circuit and pickoff control means between said inner and outer gimbal members comprising relatively movable contact members operable to close said circuit upon relative tilting movement of the inner gimbal member in the outer gimbal member in one direction past a fixed reference plane with respect to the pivotal axis of the outer gimbal member and to open said circuit upon tilting movement of said inner gimbal in the outer gimbal member in the opposite direction past said reference plane, reversible electromagnetic means between the fixed support and the outer gimbal members for applying torque in opposite directions to said outer gimbal member to reversely precess the inner gimbal member back and forth across said reference plane, including an electric relay device electrically connected in said circuit and to said torque-applying means and arranged to be energized by said circuit for controlling the direction of torque application to said torque-applying means to apply torque to the outer gimbal member in one direction, said relay device including circuit-closing means electrically connected to said torque-applying means and operable when the relay is de-energized to reversely energize said torque-applying means and cause reverse application of torque to the outer gimbal member in the opposite direction to reversely precess said inner gimbal toward said reference plane, and torque applying means between said inner and outer gimbal members for selectively and variably precessing said outer gimbal member and rotor spin axis in opposite directions in a plane intersecting said plane of tilt of the spin axis of the rotor.

5. In a gyroscope device, a support, inner and outer gimbal members carried thereby for pivotal movement in mutually intersecting planes, a rotor mounted to rotate with its spin axis fixed in relation to said inner gimbal member, means for driving said rotor, reversible precession control means for said inner gimbal member including a circuit and pickoff control means between said inner and outer gimbal members comprising relatively movable contact members operable to close said circuit upon relative tilting movement of the inner gimbal member in one direction past a fixed reference plane with respect to the pivotal axis of the outer gimbal and to open said circuit upon tilting movement of said inner gimbal in the opposite direction past said reference plane, reversible electromagnetic means for applying torque in opposite directions to said outer gimbal member to reversely precess the inner gimbal member back and forth across said reference plane, including an electric relay device electrically connected in said circuit and to said torque-applying means and arranged to be energized by said circuit for controlling the direction of torque application to said torque-applying means to apply torque to the outer gimbal member in one direction when energized, said relay device including circuit-closing means electrically connected to said torque-applying means and operable when the relay is de-energized to reversely energize said torque-applying means and cause reverse application of torque to the outer gimbal member in the opposite direction to reversely precess said inner gimbal member toward said reference plane, means between said inner and outer gimbal members for selectively and variably applying torque to the inner gimbal member to precess said outer gimbal member in opposite directions in a plane intersecting said reference plane, and power-operated follow-up means between the support and said outer gimbal member comprising reversible servomotor-operating means, an energizing circuit for said servomotor-operating means including an outer gimbal-controlling relay device, an outer gimbal pickoff control member movable with the outer gimbal member having relay-energizing contacts, and follow-up control contact means operable by said servomotor-operating means cooperating with said last-mentioned relay-energizing contacts and shiftable by said power operated follow-up means with relation to a reference plane fixed with respect to said outer gimbal member to establish contact therebetween for energizing said relay upon movement of the follow-up contact means to one side of said last reference plane to close said contacts, and to de-energize said relay device upon movement of said follow-up contact means to the other side of said last-mentioned reference plane, and a reversible controlling circuit between said relay device and said servomotor means operable when said relay is energized to operate said servomotor means to move the follow-up means in one direction to said reference plane and when de-energized, to reversely energize said servomotor means to move said follow-up means in the opposite direction to said reference plane.

6. In a gyroscope device, a fixed support, inner and outer gimbal members carried thereby for tilting movements about mutually perpendicular axes, a power-driven rotor carried by said inner gimbal with its axis disposed perpendicular to the axis of the inner gimbal member, reversible electromagnetic torque applying means between said support and outer gimbal member for applying a rotative torque to the outer gimbal member to precess the inner gimbal member and rotor spin axis to a reference plane fixed with respect to said outer gimbal, including reversible circuit closing pick-off control means between said inner and outer gimbal members operatively connected to said reversible electromagnetic torque applying means for operation thereof incident to movement of said inner gimbal and rotor spin axis out of said reference plane, reversible selectively operable electromagnetic torque applying means between said inner and outer gimbals for applying rotative torque to said inner gimbal member around its axis in a plane perpendicular to the inner gimbal axis, said reversible selectively operable electromagnetic torque applying means comprising a torque receiving member carried by one of said gimbal members and a reversible rotary torque applying member shiftably carried by the other gimbal member and movable into and out of operative engagement with the torque receiving member, including reversible electromagnetic driving means therefor, means for normally holding said shiftable rotary torque applying member disengaged from the torque receiving member, electromagnetic means including an energizing circuit, for shifting the torque applying member into torquing engagement with said torque receiving member and simultaneously selectively actuating said reversible electromagnetic driving means in one direction or the other to selectively apply torque from the outer gimbal member to the inner gimbal member in one direction or the other to selectively precess the rotor spin axis and outer gimbal to any selected position about the outer gimbal axis with respect to said support.

WILLIAM R. WEEMS.